United States Patent [19]

Shaw

[11] Patent Number: 5,211,214

[45] Date of Patent: May 18, 1993

[54] GOLF CART WINDOW APPARATUS

[76] Inventor: Robert G. Shaw, Rte. 1, Box 155, Lilbourn, Mo. 63862

[21] Appl. No.: 845,553

[22] Filed: Mar. 4, 1992

[51] Int. Cl.⁵ ............................................. A47H 3/00
[52] U.S. Cl. .................. 160/369; 248/231.4
[58] Field of Search ............ 160/369, 368.1, 371; 248/231.4, 231.6, 225.31; 280/DIG. 5

[56] References Cited

U.S. PATENT DOCUMENTS

| 1,493,750 | 5/1924 | Holbrook | 160/369 X |
| 1,705,132 | 3/1929 | Norquist et al. | 160/369 |
| 2,204,761 | 6/1940 | Lang | 160/369 |
| 2,720,260 | 10/1955 | Plucinski | 160/369 X |
| 2,865,670 | 12/1958 | Dunn | 160/369 X |
| 3,958,826 | 5/1976 | Upton | 280/DIG. 5 X |
| 4,001,831 | 1/1977 | Harvey | 248/231.4 X |
| 4,773,695 | 9/1988 | Jones et al. | 280/DIG. 5 X |
| 4,795,205 | 1/1989 | Gerber | 280/DIG. 5 X |

FOREIGN PATENT DOCUMENTS

| 466084 | 9/1928 | Fed. Rep. of Germany ... 248/231.4 |
| 54531 | 5/1943 | Netherlands ................. 248/231.4 |

Primary Examiner—Blair M. Johnson
Attorney, Agent, or Firm—Antonelli, Terry, Stout & Kraus

[57] ABSTRACT

A window apparatus temporarily mountable on a front end of a golf cart type vehicle wherein the vehicle includes at least two support rods on opposite sides of the front end of the vehicle. The window apparatus includes a front panel having a screen surrounded by a rigid frame for permitting the free flow of air to and from occupants of the vehicle while protecting the occupants from contact with objects outside of the vehicle and a plurality of mounting apparatuses formed on opposite sides of the frame for fictionally engaging the two vertical supports to temporarily mount the front panel to the front end of the vehicle.

11 Claims, 2 Drawing Sheets

GOLF CART WINDOW APPARATUS

BACKGROUND OF THE INVENTION

Technical Field of the Invention

The present invention relates to window apparatus for golf carts. More particularly, the present invention relates to window apparatus temporarily mountable on the front end of a golf cart type vehicle having a screen for permitting the free flow of air to occupants of the vehicle while protecting the occupants from flying objects outside of the vehicle.

Background Art

Golf cart type vehicles are primarily used to speed players through the golf course to thereby make the golf course and the game more available to a greater number of players. In such vehicles windshields made of glass or some flexible transparent material are not always wanted or necessary particularly in mild, dry weather. The windshields are not favored in mild, dry weather because they obstruct the free flow of air and feeling of openness to the occupants of the golf cart. However, removal of such a windshield from a golf cart type vehicle eliminates the protection provided to the occupants of the vehicle from projectiles such as golf balls and insects. Thus, there exists a desire to provide to a golf cart type vehicle a window apparatus which allows the free flow of air to the occupants of the vehicle while protecting the occupants from flying objects outside of the vehicle such as insects or golf balls.

Conventional apparatuses exemplified by U.S. Pat. Nos. 4,819,979; 4,795,205; 4,792,175; 4,343,503; and 4,014,589 provides apparatus for removably attaching a windshield made of glass or flexible transparent material to the front end of a golf cart. None of the conventional apparatuses provide for the attachment of apparatus which not only permits the free flow of air to the occupants of the vehicle but also protects the occupants of the vehicle from flying objects outside of the vehicle.

U.S. Pat. No. 4,993,471 discloses a screen for covering the opening in a vehicle roof formed by a sun or moon roof. The apparatus taught by U.S. Pat. No. 4,993,471 requires that the opening be provided with a snap or loop fabric roof liner material and that the screen have a plurality of resilient hook like projections around its periphery which are capable of being entangled directly with the fabric roof liner material to form a temporary attachment. Thus, U.S. Pat. No. 4,993,471 does not disclose a screen type apparatus that is mountable on the front end of a golf cart type vehicle for permitting the free flow of air to the occupants while protecting the occupants from flying objects outside of the vehicle.

U.S. Pat. No. 1,094,049 discloses a window apparatus which is permanently mounted to the front of a vehicle, having two flexible shields or screens each mounted upon a roller wherein one of the shields or screens may be unwound from its roller and drawn upward to fill a frame permanently arranged on the front end of the vehicle. Thus U.S. Pat. No. 1,094,049 does not disclose a window apparatus that is temporarily mountable on the front end of a golf cart type vehicle for permitting the free flow of air to the occupants of the vehicle while protecting the occupants from flying objects outside of the vehicle.

SUMMARY OF THE INVENTION

The object of the present invention is to provide window apparatus which can be temporarily mounted to the front end of a golf cart type vehicle for permitting the free flow of air to the occupants of the vehicle during good weather while protecting the occupants of the vehicle from flying objects which may enter the vehicle from the front end thereof.

In order to accomplish the above, the present invention provides a window apparatus temporarily mountable on a front end of a golf cart type vehicle having a roof structure which includes vertical support rods, wherein at least two of the vertical support rods are positioned on opposite sides of the front end of the vehicle.

The window apparatus of the present invention includes a front panel having a sheet of flexible screen material surrounded by a rigid frame for permitting the free flow of air to occupants within the vehicle while protecting the occupants from contact with flying objects outside of the vehicle and a plurality of mounting apparatus formed on opposite sides of the frame for frictionally engaging the at least two vertical support rods positioned on opposite sides of the front end of the vehicle so as to mount the front panel to the front end of the vehicle.

Each mounting apparatus includes a stationary member integral with the frame and extending in a generally perpendicular direction from a back surface of the frame, a bracket, movable in a first direction away from or a second direction toward the stationary member, wherein when the bracket is moved in the first direction the bracket frictionally engages one of the at least two vertical support rods and when the bracket is moved in the second direction the bracket frictionally disengages the one vertical support rod, a bracket rod integral with the bracket and extending in a generally perpendicular direction from a back surface of the bracket through an opening in the stationary member wherein the bracket rod is movable in the first and second directions in the opening to stabilize movement of the bracket, and a resilient device disposed between the stationary member and the bracket for biasing the bracket against forces moving in the second direction.

The window apparatus of the present invention further provides a hook attached to the distal end of the bracket rod for permitting an operator to move the bracket in the first or second direction by applying a force to the hook. The bracket rod is also provided with a locking device including a screw thread formed on the surface of the bracket rod and a nut disposed on a side of the stationary member opposite the bracket for locking the bracket in one of a plurality of different positions relative to the vertical support rod by turning the nut in clockwise or counterclockwise directions.

The bracket of the window apparatus of the present invention is formed in an L shape such that the L shaped bracket contacts two adjacent sides of the vertical support rod. Also the rigid frame extends beyond each of the mounting apparatuses such that the back surface of the frame is used to frictionally engage a side of the vertical support rod adjacent the side of the vertical support rood frictionally engaged by the bracket when mounting the window apparatus. The surfaces of the bracket which frictionally engage the vertical support rod and the back surface of the frame which also frictionally engage the vertical support rod may be provided with self adhesive padding for positively attaching the window apparatus to the two vertical support rods.

BRIEF DESCRIPTION OF THE DRAWINGS

The features of the present invention which are believed to be novel are set forth with particularity in the appended claims. The invention may be best understood, however, by reference to the following description in conjunction with the accompanying drawings in which:

DESCRIPTION OF THE PREFERRED EMBODIMENT

Figure 1:
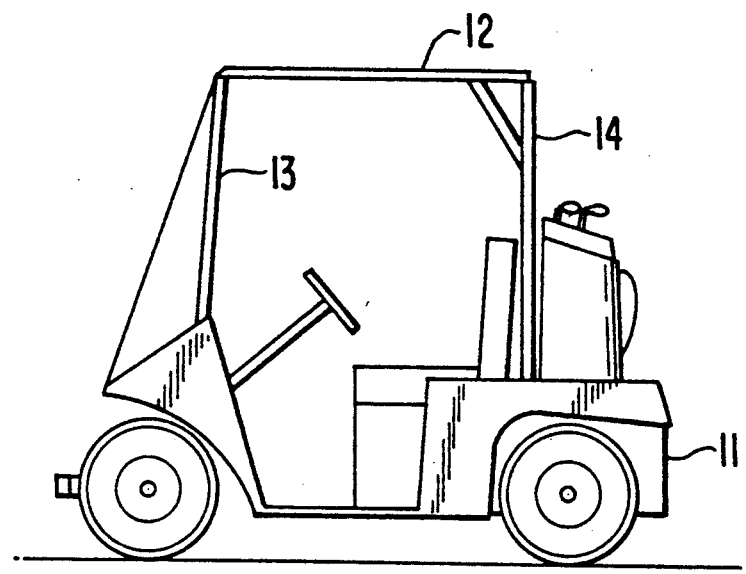
FIG. 1 is a side view of a golf cart type vehicle.
Figure 2:
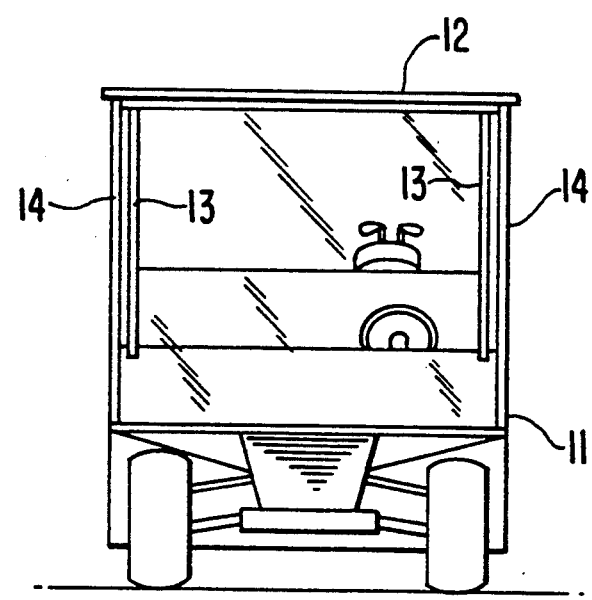
FIG. 2 is a front view of a golf cart type vehicle.
Figure 3:
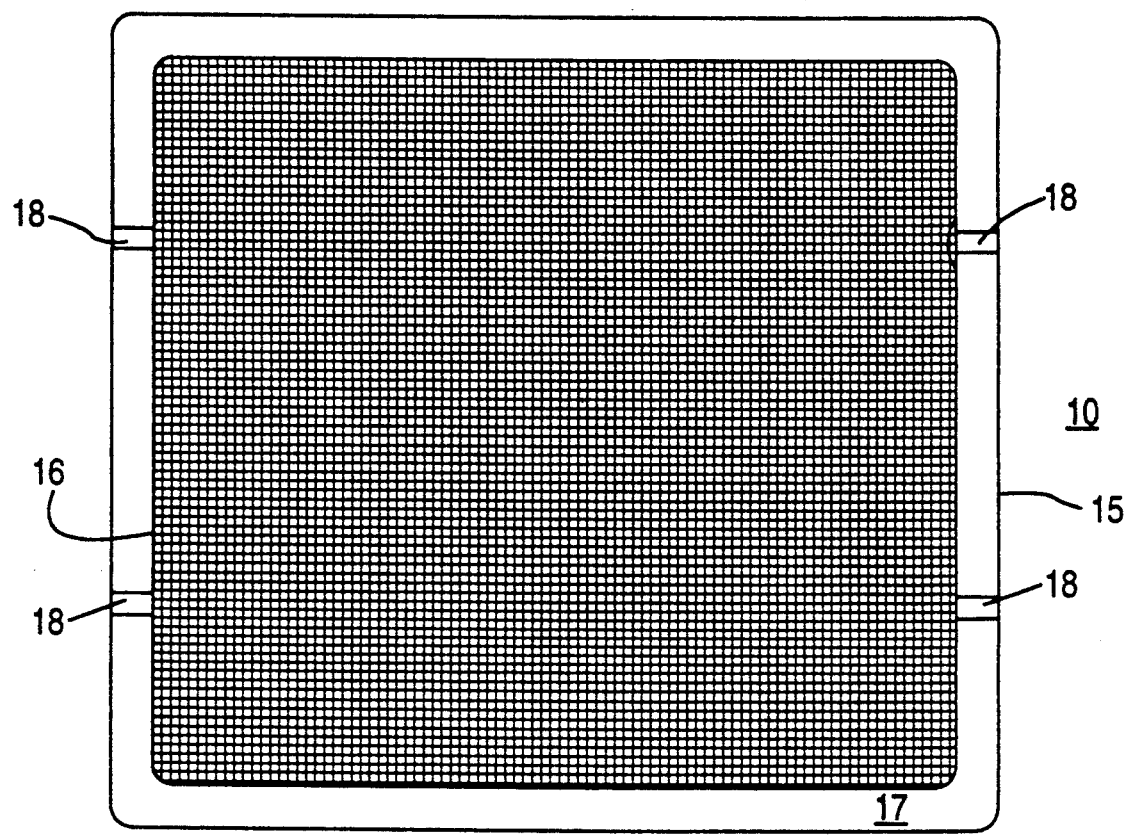
FIG. 3 is a front view of the window apparatus of the present invention.

The embodiment of the present invention will now be described with respect to FIGS. 1-4 of the present application. Particularly, the present invention provides window apparatus 10 as shown in FIG. 3 temporarily mountable on a front end of a golf cart type vehicle 11 as shown in FIGS. 1 and 2. The golf cart type vehicle 11 includes a roof structure 12 which includes vertical support rods 13, 14 wherein at least two of the vertical support rods 13 are positioned on opposite sides of the front end of the vehicle 11.

Figure 4:
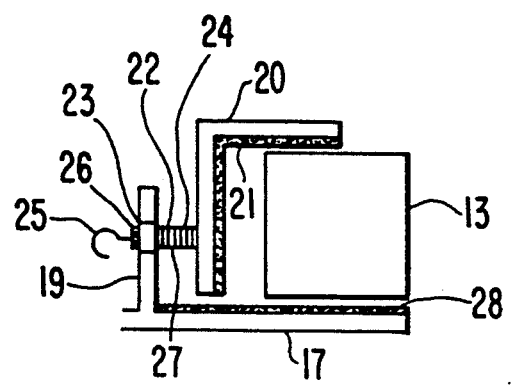
FIG. 4 is a sectional view of the mounting apparatus of the present invention.

The window apparatus as shown in FIGS. 3 and 4 includes a front panel 15 which includes a screen 16 surrounded by a rigid frame 17 for permitting the free flow of air to and from occupants of the vehicle 11 and protecting the occupants of the vehicle 11 from contact with flying objects outside of the vehicle 11 when the front panel 15 is mounted to the front end of the vehicle 11. The flying objects which may strike the occupants of the vehicle 11 may be insects, golf balls or other projectiles. The screen 16 may be made of either a fine wire mesh or plastic material. Particularly, the fine wire mesh may be ¼" welded galvanized wire.

The window apparatus further includes a plurality of mounting apparatuses 18 formed on opposite sides of the frame 17 for fictionally engaging the two front end vertical support rods 13 to temporarily mount the front panel 15 to the front end of the vehicle 11. Details representative of each of the mounting apparatuses 18 are illustrated in FIG. 4.

Each mounting apparatus 18 as represented in FIG. 4 includes a stationary member 19 integral with the frame 17 and extending in a generally perpendicular direction from the back surface of the frame 17. A bracket 20 is provided in the mounting apparatus shown in FIG. 4. The bracket 20 is movable in a first direction away from or a second direction toward the stationary member 19. When the bracket 20 is moved in the first direction the bracket 20 frictionally engages one of the vertical support rods 13. When the bracket 20 is moved in the second direction the bracket 20 frictionally disengages the vertical support rod 13. As shown in FIG. 4 the bracket 20 may be formed in a general L shape such that two adjacent sides of the vertical support rod 13 are frictionally engaged by the bracket 20. In addition the surface of the bracket 20 which frictionally engages the vertical support rod 13 is provided with a self adhesive padding 21 for positively attaching the bracket 20 to the vertical support rod 13.

A bracket rod 22 is provided in each of the mounting apparatuses 18 as shown in FIG. 4. The bracket rod 22 is integral with the bracket 20 and extends in a generally perpendicular direction from the back surface of the bracket 20 through an opening 23 in the stationary member 19. The bracket rod 22 is movable in the first and second directions in the opening 23 to stabilize movement of the bracket 20. A resilient device 24 is disposed between the stationary member 19 and the bracket 20 for biasing the bracket 20 against forces moving in the second direction A hook 25 is attached to the distal end of the bracket rod 22 so as to permit an operator to frictionally disengage the bracket 20 from the vertical support rod 13 by pulling the hook 25 in the second direction. Pulling the hook 25 in the second direction causes the bracket 20 to move in the second direction away from the vertical support rod 13. A locking device is provided on the bracket rod 22 so as to lock the bracket rod 22 in any one of a plurality of positions. The locking device includes a nut 26 for engaging a screw thread 27 provided on the surface of the bracket rod 22. Turning the nut 26 in the clockwise direction causes the bracket 20 to move in the second direction away from the stationary member 19. Turning the nut in the counterclockwise direction causes the bracket 20 which fictionally engages the vertical support rod 13 is provided with a self adhesive padding 21 for positively attaching the bracket 20 to the vertical support rod 13.

A bracket rod 22 is provided in each of the mounting apparatuses 18 as shown in FIG. 4. The bracket rod 22 is integral with the bracket 20 and extends in a generally perpendicular direction from the back surface of the bracket 20 through an opening 23 in the stationary member 19. The bracket rod 22 is movable in the first and second directions in the opening 23 to stabilize movement of the bracket 20. A resilient device 24 is disposed between the stationary member 19 and the bracket 20 for biasing the bracket 20 against forces moving in the second direction.

A hook 25 is attached to the distal end of the bracket rod 22 so as to permit an operator to frictionally disengage the bracket 20 from the vertical support rod 13 by pulling the hook 25 in the second direction. Pulling the hook 25 in the second direction causes the bracket 20 to move in the second direction away from the vertical support rod 13. A locking device is provided on the bracket rod 22 so as to lock the bracket rod 22 in any one of a plurality of positions. The locking device includes a nut 26 for engaging a screw thread 27 provided on the surface of the bracket rod 22. Turning the nut 26 in the clockwise direction causes the bracket 20 to move in the second direction away from the stationary member 19. Turning the nut in the counterclockwise direction causes the bracket 20 to move in the first direction toward the stationary member 19.

The frame 17 extends beyond each of the mounting apparatuses 18 such that a back surface of the frame 17 frictionally engages a side of the vertical support rod 13 adjacent a side of the vertical support rod 13 fictionally engaged by the bracket 20. The back surface of the frame 17 which frictionally engages the side of the vertical support rod 13 is provided with a self adhesive padding 28 for positively attaching the frame 17 to the vertical support rod 13.

As described above, the window apparatus 10 of the present invention having a screen 16 therein is temporarily mountable on the front end of a golf cart type vehicle 11 for permitting the free flow of air to and from occupants of the vehicle 11 while protecting the occupants from contact with flying objects outside of the vehicle.

While the present invention has been described in terms of its preferred embodiment it should be noted that numerous modifications may be made thereto without departing from the spirit and scope of the invention as defined in the appended claims. For example, the present invention may be used in any application which may require a screen for permitting the free flow of air while providing protection from flying objects. It is intended that all such modifications fall within the scope of the appended claims.

We claim:

1. A window apparatus temporarily mountable on a front end of a golf cart type vehicle having a roof structure which includes vertical support rods, wherein at last two of said vertical support rods are positioned on opposite sides of said front end of said vehicle, said apparatus comprising:
   a front panel which includes a screen surrounded by a rigid frame for permitting the free flow of air to and from occupants of said vehicle and protecting said occupants from contact with flying objects outside of said vehicle; and
   a plurality of mounting apparatuses, formed on opposite sides of said frame, for frictionally engaging said at least two vertical support rods to temporarily mount said front panel to said front end of said vehicle;
   wherein each mounting apparatus comprises:
      a stationary member integral with said frame and extending in a generally perpendicular direction from a back surface of said frame,
      a bracket, movable in a first direction away from or a second direction toward said stationary member, wherein when said bracket is moved in said first direction said bracket frictionally engages one of said at least two vertical support rods and when said bracket is moved in said second direction said bracket frictionally disengages said one vertical support rod, said bracket having an L-shaped cross section causing inner surfaces of said bracket to frictionally engage two sides of said one vertical support rod,
      a bracket rod integral with said bracket and extending in a generally perpendicular direction from a back surface of said bracket through an opening in said stationary member, said bracket rod being movable in said first and second directions in said opening to stabilize movement of said bracket, and
      a resilient device disposed between said stationary member and said bracket for biasing said bracket against forces moving in said second direction.

2. A window apparatus according to claim 1, wherein said resilient device is a spring.

3. A window apparatus according to claim 1, wherein said screen is made of a plastic mesh material.

4. The window apparatus according to claim 1 further comprising:
   a hook attached to the distal end of said bracket rod for permitting an operator to move said bracket in the first or second directions by applying a force to the hook.

5. A window apparatus according to claim 1 further comprising:
   a locking device for engaging said bracket rod to lock said bracket in one of a plurality of different positions relative to said one vertical support rod.

6. A window apparatus according to claim 5, wherein said locking device comprises:
   a screw thread formed on the surface of the bracket rod and a nut disposed on a side of said stationary member opposite said bracket for locking said bracket in one of said plurality of different positions relative to said one vertical support rod by turning said nut in clockwise or counterclockwise directions.

7. A window apparatus according to claim 1 further comprising:
   an adhesive pad attached to said inner surfaces of said bracket which engage said one vertical support rod for positively attaching said mounting apparatus to said vertical support rod.

8. A window apparatus according to claim 1 wherein said frame extends beyond said mounting apparatus such that said back surface of said frame is used to frictionally engage a side of said one vertical support rod other than said two sides frictionally engaged by said bracket when mounting said window apparatus.

9. A window apparatus according to claim 1 further comprising:
   an adhesive pad attached to said back surface of said frame for positively attaching said mounting apparatus to said one vertical support rod.

10. A window apparatus according to claim 1 wherein said screen is made of a wire mesh material.

11. A window apparatus according to claim 10 wherein said wire mesh material is ¼" welded galvanized wire mesh.

* * * * *